United States Patent
Zori et al.

(10) Patent No.: US 10,515,161 B1
(45) Date of Patent: Dec. 24, 2019

(54) TRANSIENT BLADE ROW FLOW MODELING WITH PROFILE-TRANSFORMATION PITCH-CHANGE MODEL AND HARMONIC SOLUTION METHOD

(71) Applicant: Ansys, Inc., Canonsburg, PA (US)

(72) Inventors: Laith Zori, Clifton, VA (US); Paul Galpin, Kitchener (CA); Rubens Campregher, Waterloo (CA); Juan Carlos Morales, Waterloo (CA); Phillipe Godin, Waterloo (CA)

(73) Assignee: Ansys, Inc., Canonsburg, PA (US)

( * ) Notice: Subject to any disclaimer, the term of this patent is extended or adjusted under 35 U.S.C. 154(b) by 406 days.

(21) Appl. No.: 15/153,765

(22) Filed: May 13, 2016

Related U.S. Application Data

(60) Provisional application No. 62/161,947, filed on May 15, 2015.

(51) Int. Cl.
   *G06F 17/50* (2006.01)

(52) U.S. Cl.
   CPC ...... *G06F 17/5009* (2013.01); *F05D 2260/81* (2013.01); *G06F 2217/16* (2013.01)

(58) Field of Classification Search
   CPC .. G06F 17/5009; G06F 17/14; G06F 2217/16; F04D 29/542; F04D 29/38; F01D 5/12; F01D 9/041; F05D 2260/81
   USPC .......................................................... 703/2
   See application file for complete search history.

(56) References Cited

PUBLICATIONS

Connell, Stuart, et al. "A comparison of advanced numerical techniques to model transient flow in turbomachinery blade rows." ASME 2011 Turbo Expo: Turbine Technical Conference and Exposition. American Society of Mechanical Engineers, 2011. pp. 1-10.*
Des Francs, Gérard Colas, Jean-Paul Hugonin, and JiřiCtyroký. "Mode solvers for very thin long-range plasmonic waveguides." Optical and Quantum Electronics 42.8 (Published online 2010). pp. 1-14.*
Giles, Michael B. "Calculation of unsteady wake/rotor interaction." Journal of Propulsion and Power 4.4 (1988). pp. 356-362.*

(Continued)

*Primary Examiner* — Kamini S Shah
*Assistant Examiner* — John E Johansen
(74) *Attorney, Agent, or Firm* — Jones Day

(57) ABSTRACT

Systems and methods are provided for modeling fluid flow in a turbomachine. A specification of a system including at least a stator and a rotor of a turbomachine is received. The stator is coupled to the rotor via a profile-transformation (PT) interface. A flow profile for fluid flow across the PT interface is expanded or compressed based on a pitch ratio between the stator and the rotor. Flow variables of governing flow equations for the fluid flow in the system are represented as a Fourier series with spatially-varying Fourier coefficients. The Fourier series representation is substituted into the governing flow equations to obtain a modified form of the governing flow equations. The modified form of the governing flow equations is solved using a steady-state solution method to model the fluid flow in the system. The modeling utilizes an implicit solution discretization across the PT interface.

24 Claims, 14 Drawing Sheets

(56) References Cited

PUBLICATIONS

Blumenthal, Rob, Brad Hutchinson, and Laith Zori. "Investigation of transient CFD methods applied to a transonic compressor stage." ASME 2011 Turbo Expo: Turbine Technical Conference and Exposition. American Society of Mechanical Engineers, 2011. pp. 1-8.*

Mileshin, Victor, et al. "Numerical and experimental investigations of steady and unsteady characteristics of a counter rotating fan model with thickened blades of working wheel." ASME Turbo Expo 2012: Turbine Technical Conference and Exposition. American Society of Mechanical Engineers, 2012. pp. 1-10.*

Connell, Stuart, et al. "A comparison of advanced numerical techniques to model transient flow in turbomachinery blade rows." ASME 2011 Turbo Expo: Turbine Technical Conference and Exposition. American Society of Mechanical Engineers, 2011. pp. 110. (Year: 2011).*

* cited by examiner

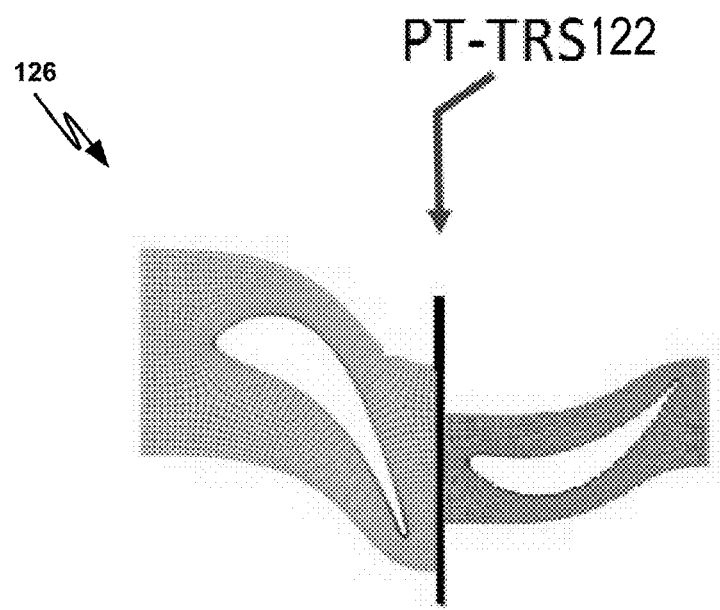
FIG. 1B
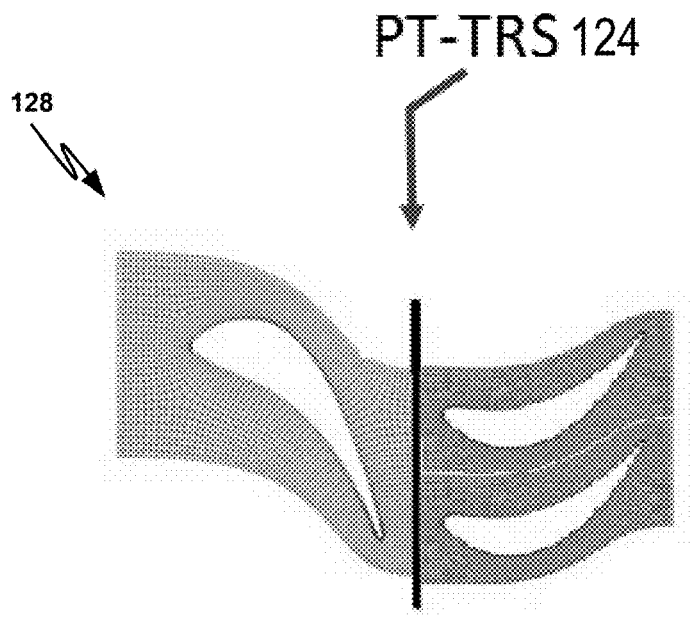

time=0
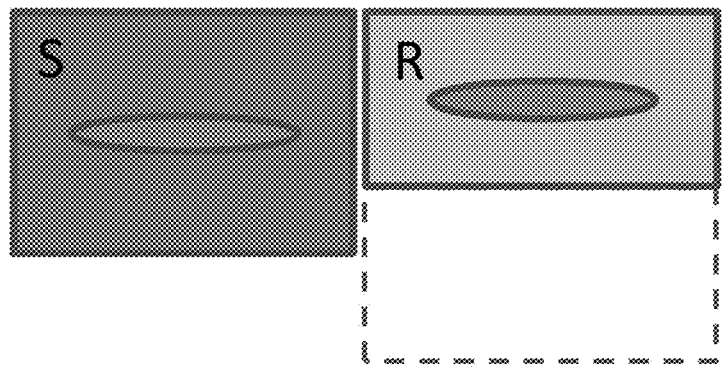
time=1/3 T_rotor
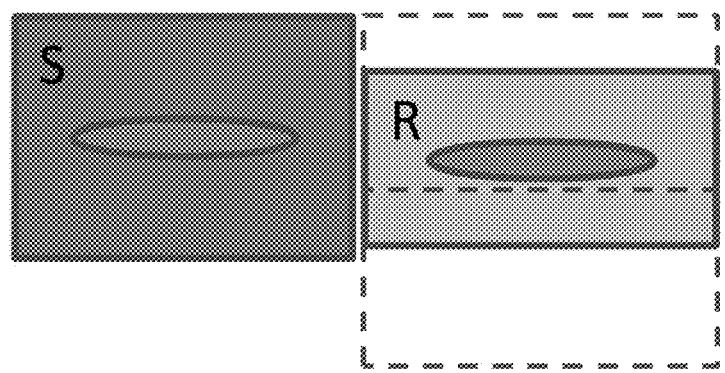
FIG. 7
time=2/3 T_rotor
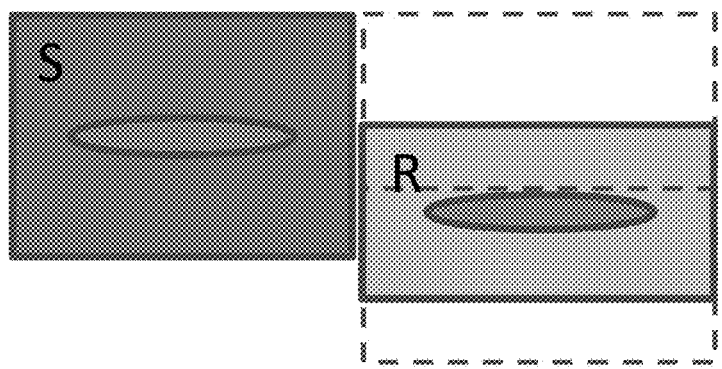

time=0
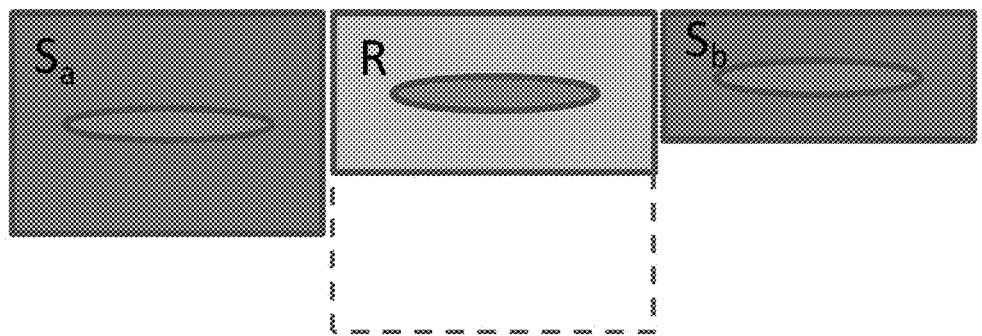
time=1/3 T$_{rotor}$
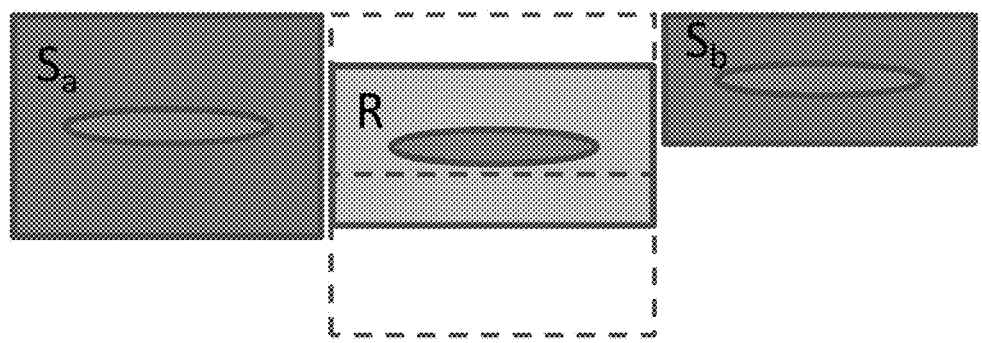
FIG. 8
time=2/3 T$_{rotor}$
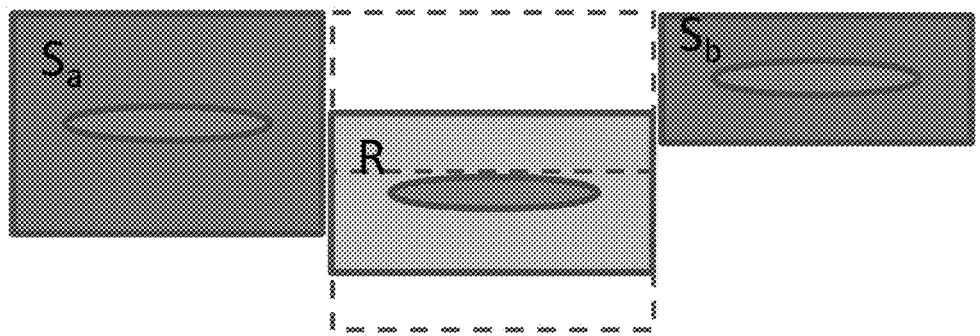

US 10,515,161 B1

TRANSIENT BLADE ROW FLOW MODELING WITH PROFILE-TRANSFORMATION PITCH-CHANGE MODEL AND HARMONIC SOLUTION METHOD

CROSS-REFERENCE TO RELATED APPLICATIONS

This application claims priority to U.S. Provisional Patent Application No. 62/161,947, filed May 15, 2015, entitled "Transient Blade Row Flow Modeling With Profile-Transformation Pitch-Change Model and Harmonic Solution Method," which is incorporated herein by reference in its entirety.

FIELD

This disclosure is related generally to computer-aided design and more particularly to systems and methods for modeling fluid flow in blade rows of a turbomachine.

BACKGROUND

A turbomachine is a device in which energy is transferred either to, or from, a continuously flowing fluid by the dynamic action of one or more moving blade rows. The one or more moving blade rows of a turbomachine are commonly used to compress or expand a fluid. For example, a compressor for a gas turbine engine may include several rows of rotor blades and stator blades that progressively compress a fluid to high pressures. Computational fluid dynamics (CFD) software is used to simulate and display the flow of fluid between stages of a turbomachine. In general, modern CFD software provides the ability to simulate and display flows of gases and liquids through physical systems using computer-based numerical calculations.

SUMMARY

Systems, methods, and non-transitory computer-readable storage mediums are provided for modeling fluid flow in blade rows of a turbomachine. In an example computer-implemented method for modeling fluid flow in blade rows of a turbomachine, a specification of a system including at least a first stator and a rotor of a turbomachine is received. The first stator is coupled to the rotor via a first profile-transformation (PT) interface as part of a profile-transformation pitch-change technique. A flow profile for fluid flow across the first PT interface is expanded or compressed based on a pitch ratio between the first stator and the rotor. Flow variables of governing flow equations for the fluid flow in the system are represented as a Fourier series with spatially-varying Fourier coefficients, the Fourier series including one or more terms that are based on the rotor's passing frequency. The Fourier series representation is substituted into the governing flow equations to obtain a modified form of the governing flow equations. A pseudo-time term is introduced into the modified form of the governing flow equations. The pseudo-time term causes the equations to have a form capable of being solved using a steady-state solution method. The modified form of the governing flow equations is solved using the steady-state solution method to model the fluid flow in the system. The modeling utilizes an implicit solution discretization across the first PT interface.

An example computer-implemented system for modeling fluid flow in blade rows of a turbomachine includes a processing system and a memory in communication with the processing system. The processing system is configured to execute steps. In executing the steps, a specification of a system including at least a first stator and a rotor of a turbomachine is received. The first stator is coupled to the rotor via a first PT interface as part of a profile-transformation pitch-change technique. A flow profile for fluid flow across the first PT interface is expanded or compressed based on a pitch ratio between the first stator and the rotor. Flow variables of governing flow equations for the fluid flow in the system are represented as a Fourier series with spatially-varying Fourier coefficients, the Fourier series including one or more terms that are based on the rotor's passing frequency. The Fourier series representation is substituted into the governing flow equations to obtain a modified form of the governing flow equations. A pseudo-time term is introduced into the modified form of the governing flow equations. The pseudo-time term causes the equations to have a form capable of being solved using a steady-state solution method. The modified form of the governing flow equations is solved using the steady-state solution method to model the fluid flow in the system. The modeling utilizes an implicit solution discretization across the first PT interface.

An example non-transitory computer-readable storage medium for modeling fluid flow in blade rows of a turbomachine includes computer-executable instructions which, when executed, cause a processing system to execute steps. In executing the steps, a specification of a system including at least a first stator and a rotor of a turbomachine is received. The first stator is coupled to the rotor via a first PT interface as part of a profile-transformation pitch-change technique. A flow profile for fluid flow across the first PT interface is expanded or compressed based on a pitch ratio between the first stator and the rotor. Flow variables of governing flow equations for the fluid flow in the system are represented as a Fourier series with spatially-varying Fourier coefficients, the Fourier series including one or more terms that are based on the rotor's passing frequency. The Fourier series representation is substituted into the governing flow equations to obtain a modified form of the governing flow equations. A pseudo-time term is introduced into the modified form of the governing flow equations. The pseudo-time term causes the equations to have a form capable of being solved using a steady-state solution method. The modified form of the governing flow equations is solved using the steady-state solution method to model the fluid flow in the system. The modeling utilizes an implicit solution discretization across the first PT interface.

BRIEF DESCRIPTION OF THE DRAWINGS

FIG. 1B depicts example reduced geometries utilized in the profile-transformation pitch-change technique described herein.

FIG. 7 illustrates blade coupling between stator and rotor zones for an example in which only one harmonic mode is retained.

FIG. 8 illustrates blade coupling in an example 1.5 stage system including a first stator zone, a rotor zone, and a second stator zone.

DETAILED DESCRIPTION

Figure 1A:
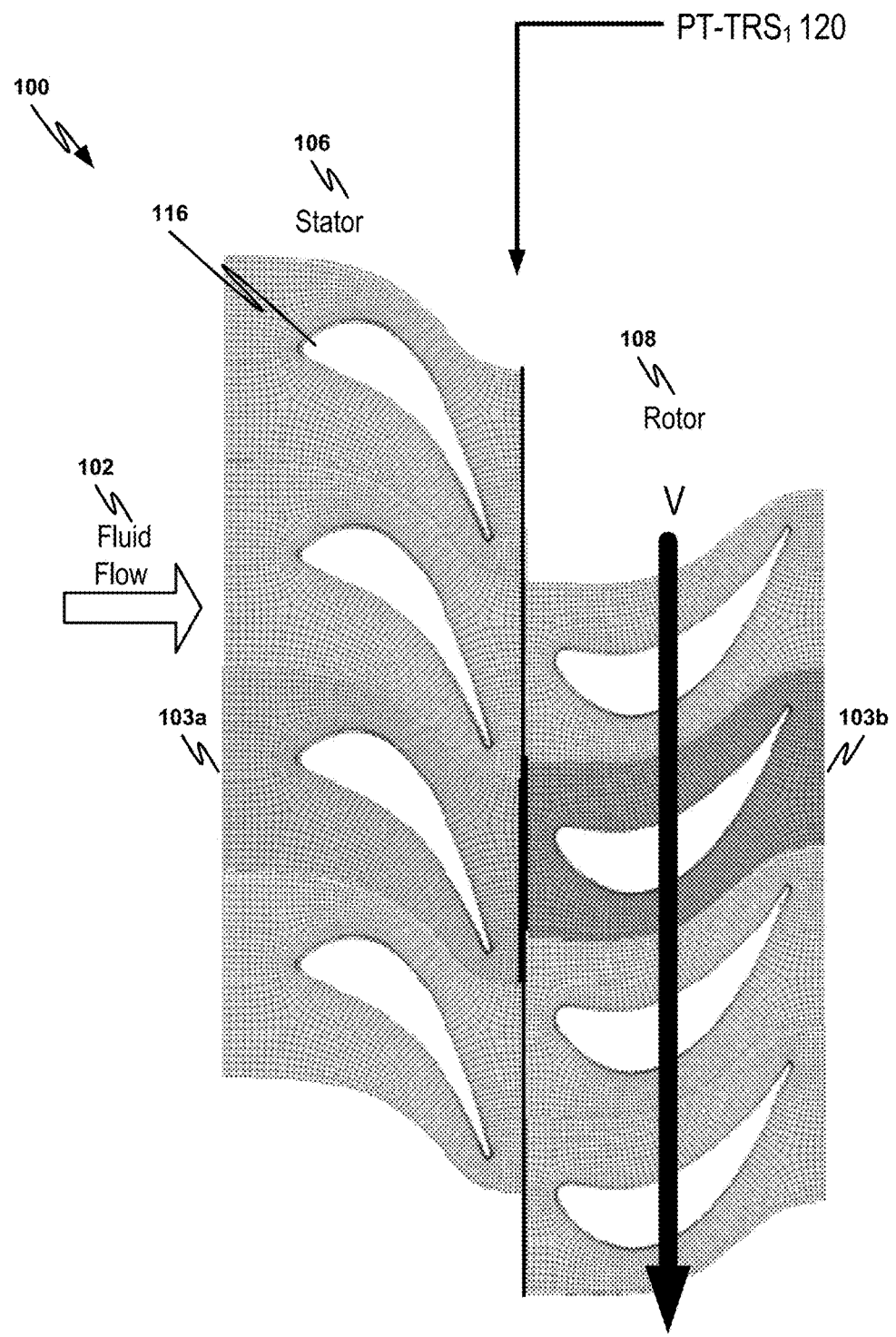
FIG. 1A depicts an example system including stator and rotor blade rows of a turbomachine.

FIG. 1A depicts an example system 100 including stator and rotor blade rows 106, 108 of a turbomachine. As indicated in the figure, the example system 100 may be referred to as a "single-stage turbomachine configuration," where each of the blade rows 106, 108 constitutes one-half of a stage. The system 100 may comprise a portion of a turbine or a compressor, for example. In an example, the stator blade row 106 may be an inlet guide vane of a turbomachine, and the rotor blade row 108 may be a first rotor of the turbomachine. In other examples, the blade rows 106, 108 may comprise a different pair of stator and rotor blade rows of the turbomachine. Thus, it is noted that the blade rows 106, 108 may be located in any portion of a turbomachine (e.g., near an inlet of the turbomachine, within a middle portion of the turbomachine, near an outlet of the turbomachine, etc.). Each of the stator and rotor blade rows 106, 108 comprise a number of blades 116 in 360 degrees. In the example of FIG. 1A, the blades of the rotor blade row 108 are connected to a hub, thus allowing these blades to rotate at a circumferential velocity of V. By contrast, the blades of the stator blade row 106 are stationary and do not move.

In an example, one rotor of the blade row 108 is coupled to one stator of the blade row 106 via a profile-transformation (PT) interface 120 as part of a profile-transformation pitch-change method. The PT interface 120 is used with a reduced geometry, e.g., a single passage or a few passages per row, as discussed below. Thus, contrary to what is depicted in FIG. 1A, the PT interface 120 does not couple the entire stator blade row 106 to the rotor blade row 108. Instead, for example, the PT interface 120 may couple stator 103a to rotor 103b. The PT interface 120 is labeled in FIG. 1A as a "PT-TRS" interface, i.e., a profile-transformation transient rotor-stator interface. As illustrated in FIG. 1A, a flow of fluid 102 passes from the stator blade row 106, through the PT interface 120, and to the rotor blade row 108. In the profile-transformation pitch-change method, a flow profile for the fluid flow 102 across the PT interface 120 is expanded or compressed (e.g., scaled) based on a pitch ratio between the stator 106 and the rotor 108. Pitch values for the stator blade row 106 and the rotor blade row 108 specify a pitch between adjacent blades of the respective blade row. Thus, a pitch value for the stator blade row 106 specifies a distance between adjacent blades of the stator blade row 106, and a pitch value for the rotor blade row 108 specifies a distance between adjacent blades of the rotor blade row 108.

Figure 2:
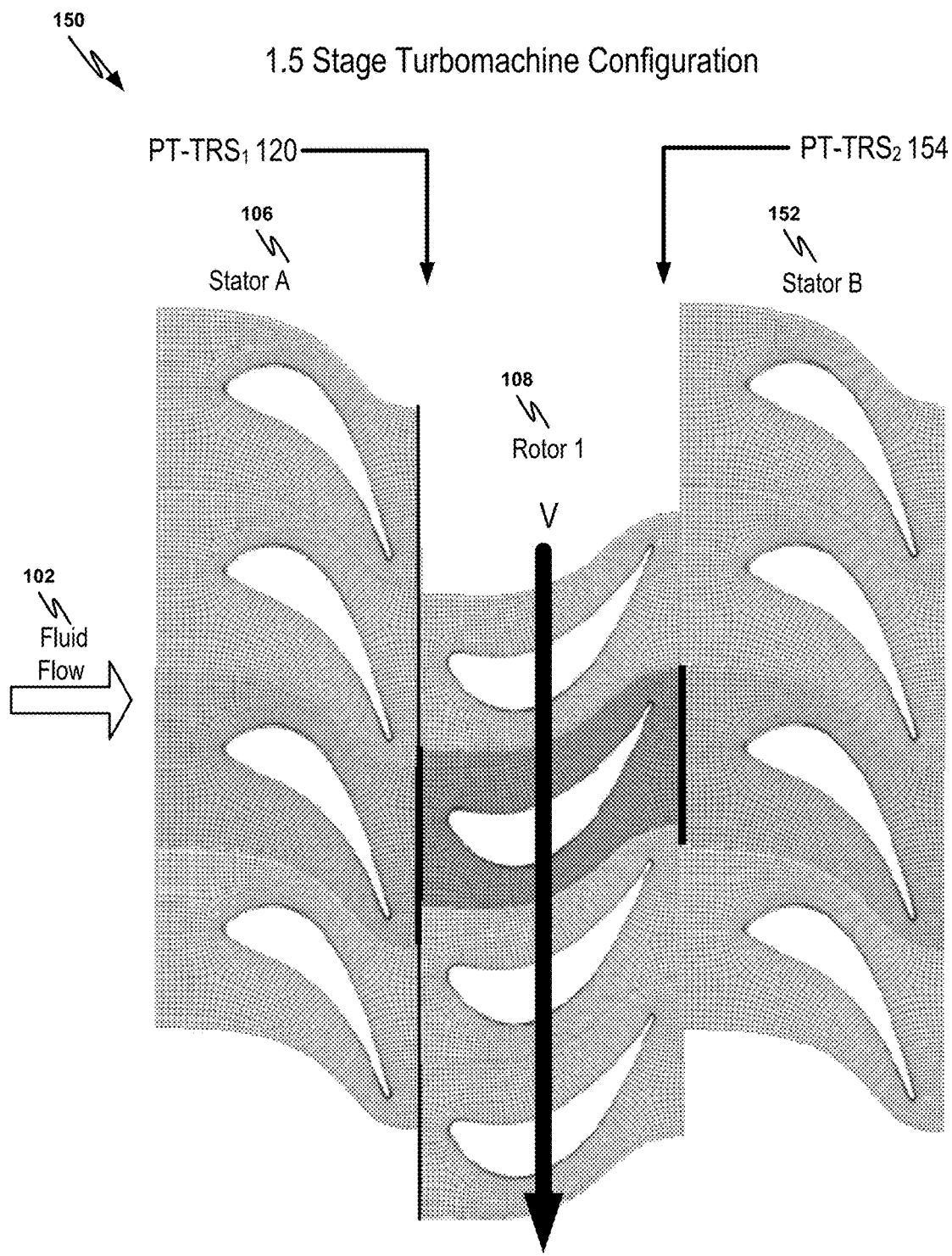
FIG. 2 depicts an example system including a rotor blade row and two stator blade rows of a turbomachine.

Under the approaches described herein, for turbomachine configurations having up to 1.5 stages (e.g., a stator/rotor/stator configuration, as illustrated in FIG. 2 and described below), the dominant frequency in the solution generated via the profile-transformation pitch-change method is the rotor passing frequency. Because the dominant frequency in the solution for up to 1.5 stages is the rotor passing frequency, the profile-transformation pitch-change method works well under a single frequency based harmonic analysis solution method. The combination of the profile-transformation pitch-change method and the harmonic analysis solution method are described in further detail below.

The system 100 represents a physical system or structure to be analyzed via a computer-aided simulation (e.g., a computational fluid dynamics (CFD) simulation). For example, the system 100 may be analyzed to model fluid flow in one or more of the blade rows 106, 108. In modeling the fluid flow in one or more of the blade rows 106, 108, the turbomachinery analysis may utilize a transient blade row analysis simulation. Such a transient simulation may be used to improve the prediction of the aerodynamic and aerothermodynamic performance of turbomachines. For example, in order to accurately predict blade surface temperature in gas turbines, the hot gases emanating from the combustor must be resolved and captured as they migrate down the turbine blade rows. This can be done only with transient bade row analysis simulation. Further, the transient blade row analysis simulation may allow for better capturing of the complex inter-blade physics between blade rows 106, 108, as compared to conventional steady-state simulation methods. Since the number of blades in the rows 106, 108 may be different (i.e., the blade rows 106, 108 have a pitch change), a conventional approach to modeling the fluid flow in one or more of the blade rows 106, 108 may use a full-domain modeling approach, where the entire turbomachine geometry is modeled. However, full-domain modeling is computationally expensive both in computer processing and memory requirements and is generally not practical.

To avoid the use of such full-domain modeling, the systems and methods described herein utilize a pitch-change model to model fluid flow in one or more of the blade rows 106, 108. The pitch-change model is used to model the fluid flow using a reduced geometry (e.g., a single passage or a few passages per row), thus reducing the overall computational resource requirements. There are a number of different pitch-change models, and each of these models has different properties. A summary of pitch-change models and methods is included in "Time Transformation Simulation of 1.5 Stage Transonic Compressor," L. Zori et al., ASME Turbo Expo GT2015-43624, which is incorporated herein by reference in its entirety.

To illustrate example reduced geometries that may be used in a pitch-change model, reference is made to FIG. 1B. This figure depicts profile-transformation transient rotor-stator (PT-TRS) interfaces 122, 124 that are utilized in modeling fluid flow using the reduced geometries 126, 128. In the reduced geometries 126, 128, a single passage or few passages per row are used. It should be understood that FIGS. 1A and 2 are used to illustrate high-level aspects of the systems being modeled, but the profile-transformation pitch-change model discussed below uses a reduced geometry, e.g., as depicted in the examples of FIG. 1B, in modeling the fluid flow in such systems. As described in further detail below, the profile-transformation pitch-change model models a single passage or few passages per blade row while accounting for pitch-change across adjacent inter-row blade passages. This is accomplished by imposing standard periodicity on the pitchwise boundaries and stretching or compressing the flow profiles at each rotor/stator interface in the circumferential direction via an interface flux scaling procedure. While there is a frequency error proportional to the pitch ratio at each interface, the profile-transformation pitch-change model improves over previous approaches (e.g., steady-state mixing-plane approaches). To reduce the profile-transformation pitch-scaling error, multiple passages per row can be used so that the ensemble pitch ratio is closer to unity. To illustrate an example of this, reference is made to FIG. 1B. In reduced geometry 126, an ensemble pitch ratio may differ from unity by a relatively large amount. To bring the ensemble pitch ratio closer to unity, an additional rotor passage may be added, as shown in the reduced geometry 128 of FIG. 1B. Further, to bring the ensemble pitch ratio closer to unity, other numbers of stator passages and rotor passages are used (e.g., two stator passages and three stator passages, etc.), in examples.

As noted above, the systems and methods described herein use, specifically, a profile-transformation pitch-change model. If the exact blade passing frequency is not needed from the analysis, then the profile-transformation pitch-change model is a suitable model to account for the strong interactions between rotors and stators and at the same time provide sufficient prediction of the machine's aerodynamic performance (e.g., efficiency and pressure ratio). The profile-transformation pitch-change model is described in "Three-Dimensional Navier Stokes Predictions of Steady State Rotor/Stator Interaction with Pitch Change," P. F. Galpin et al., Third Annual Conference of the CFD Society of Canada (Banff, Canada, 1995), which is incorporated herein by reference in its entirety. In turbine flow simulations, the profile-transformation pitch-change model can be used to model hot streak migration through turbine blade rows. Conventionally, the profile-transformation pitch-change model is used only for flow solution problems that are marched in time until solution convergence to a periodic state is reached. The conventional time-marching methods generally take a very long time to reach a converged, periodic-in-time state and require significant computational resources.

To accelerate convergence of the transient periodic flow with the profile-transformation pitch-change model, the systems and methods described herein utilize a harmonic analysis solution method that is a hybrid time- and frequency-domain solution method. The harmonic analysis method (also known as the "harmonic balance" method) is described in "Three-Dimensional Unsteady Multi-stage Turbomachinery Simulations using the Harmonic Balance Technique," A. Gopinath et al., AIAA paper 2007-0892, 45th Aerospace Sciences Meeting & Exhibit, Reno, Nev. 2007, and "Computation of Unsteady Nonlinear Flows in Cascades Using Harmonic Balance Technique," K. C. Hall et al., J. AIAA 2002, V.40 No.5, both of which are incorporated herein by reference in their entireties. Thus, the systems and methods described herein integrate the profile-transformation pitch-change method under the harmonic analysis solution method in order to rapidly solve for transient periodic flow in turbomachine configurations having up to 1.5 stages (e.g., a stator/rotor/rotor arrangement). It is noted that the systems and methods described herein improve the functioning of a computer system as compared to the conventional approaches (e.g., conventional approaches that utilize time-marching methods, as described above), because the integration of the profile-transformation pitch-change method under the harmonic analysis solution method enables the modeling of systems to be carried out (i) more efficiently (e.g., faster), (ii) with a reduced processing burden, and/or (iii) with reduced memory requirements, as compared to the conventional approaches.

As described in further detail below, the 1.5 stage turbomachine configuration with one rotor and two stators results in a single-frequency harmonic analysis due to the unique properties of the profile-transformation pitch-change method. The combination of the profile-transformation pitch-change method and the harmonic analysis solution method maintains a fully implicit solution discretization and thus achieves the highest possible convergence under harmonic analysis. The combination thus enables significant advantages over other techniques (e.g., Fourier-based harmonic methods). These aspects are described in further detail below.

To illustrate a 1.5 stage turbomachine configuration, reference is made to FIG. 2. The system 150 of FIG. 2 is similar to the system 100 of FIG. 1A, but in FIG. 2, a second stator row 152 is coupled to the rotor row 108. In an example, one stator of the blade row 152 is coupled to one rotor of the blade row 108 via a second PT interface 154. The PT interface 154 is used with a reduced geometry, e.g., a single passage or a few passages per row, as discussed above with reference to FIG. 1B. Thus, contrary to what is depicted in FIG. 2, the PT interface 154 does not couple the entire stator blade row 152 to the rotor blade row 108. A flow profile for the fluid flow 102 across the second PT interface 154 is expanded or compressed based on a pitch ratio between the rotor row 108 and the second stator row 152. In modeling the fluid flow in the blade rows 106, 108, 152 of the 1.5 stage system 150 using the combination of the profile-transformation pitch-change method and the harmonic analysis method, the modeling utilizes a fully implicit solution discretization across both the first PT interface 120 and the second PT interface 154. This is described in further detail below.

In analyzing the system 100 of FIG. 1A or the system 150 of FIG. 2, a specification of the system to be analyzed is received or generated. The specification of the system may include positioning data (i.e., placement data) that defines a positioning of the blade rows in relation to each other and in relation to other aspects (e.g., boundaries, etc.) of the system. The specification of the system may further include geometric data comprising geometrical attributes for each of the blade rows of the system, among other components. In an example, the geometric data includes, for example, the shape of the blades' surfaces, number of blades per row, number of stages, and sizes of the various components included in the system.

In an example, the specification for the system may describe the geometry and/or positioning data of the system as a set of surface triangles for each of the components included in the system. In other examples, the geometry and/or positioning data may be described using an industry standard definition (e.g., IGES, STEP, or STL), a proprietary format (e.g., ACIS, CATIA, and SDRC), or another format. Aspects of the system and the geometry thereof can also be specified using mechanical CAD (MCAD) system databases, for example. It should be understood that the formats and databases listed here are examples only. Thus, the geometry and/or positioning data may be specified in any number of different formats, and the acceptable formats are not limited to those listed above. It should also be understood that the illustrations of FIGS. 1A and 2 may not be representative of the geometry and/or positioning data included in the specification. For example, the blade rows 106, 108, 152 in the illustrations of FIGS. 1A and 2 may not be arranged based on the positioning data included in the specification. Further, although components are depicted in the illustrations of FIGS. 1A and 2 as being two-dimensional objects, it should be understood that the system to be analyzed may include three-dimensional objects. For such three-dimensional objects, the specification includes data defining the size and shape of the components in three dimensions.

The received specification may include other parameters describing features of the system to be analyzed. For example, all necessary boundary conditions to define the fluid flow in the system may be included in the specification. The boundary conditions may include inlet and outlet boundary specifications such as pressure, temperature, and flow angles, among others. The specification may further include the value V specifying the rotational velocity of the rotor row 108 and other rotors included in the system. Various other parameters may be included in the specification of the system to be analyzed (e.g., physical and material attributes for each of the components, boundary conditions for the system to be analyzed, momentum values, back pressure of one or more of the airfoils included in the system, etc.). It should be understood that the parameters listed herein as being included in the specification may not be an exhaustive list, and that various other parameters may be included in the received specification for performing the analysis of the system.

In analyzing the system 100 of FIG. 1A or the system 150 of FIG. 2, one or more computational grids may be generated based on the received specification and/or additional other parameters. Broadly, analysis of the system is performed using computer-based CFD methods, which allow a continuous problem domain to be replaced with a discrete domain using the one or more computational grids. For example, in the continuous problem domain, each flow variable to be solved in the system is defined at every point in the domain. By contrast, in the discrete domain, each flow variable is defined only at discrete grid points of the one or more computational grids. In the computer-based CFD method, analyzing the system includes solving for the relevant flow variables only at the grid points of the computational grid, with values at other locations being determined by interpolating the values at the grid points. The computational grid may be composed, for example, of quadrilateral cells, triangular cells, or cells of another type (e.g., hexahedrals, tetrahedral, prisms, etc.), and the aforementioned grid points (i.e., nodes). As described in further detail below, in analyzing the systems 100, 150 and modeling the flow of fluid through the systems 100, 150, flow equations are solved across the one or more computational grids using computer-based numerical simulations.

Figure 3:
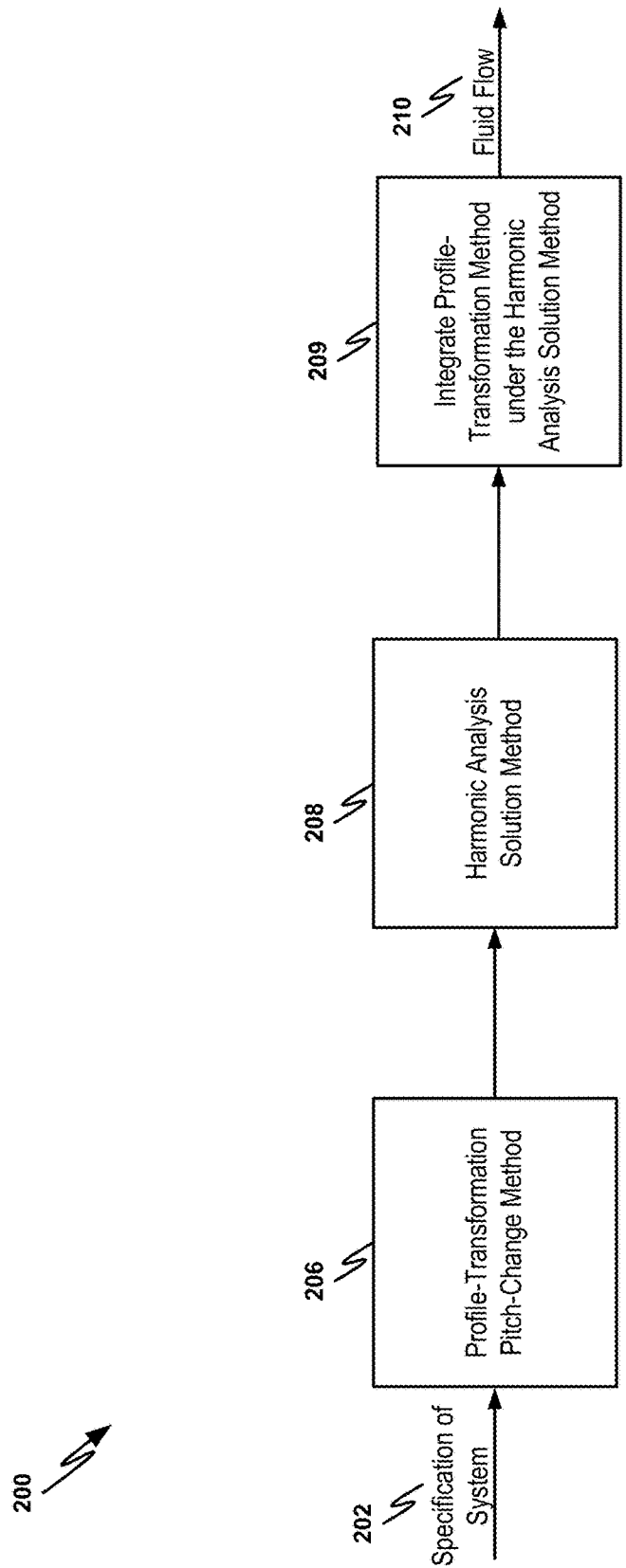
FIG. 3 is a flow diagram depicting high-level steps of a method of modeling fluid flow in blade rows of a turbomachine.

In analyzing the example systems 100, 150 of FIGS. 1A and 2, steps of the flow diagram 200 of FIG. 3 are performed. The steps of the flow diagram 200 are performed to solve the turbomachinery flow problem and ultimately model a fluid flow 210 in one or more blade rows of the systems 100, 150. As illustrated in FIG. 3, the systems and methods described herein include (i) the profile-transformation pitch-change method 206, and (ii) the harmonic analysis solution method 208. As indicated at 209, the profile-transformation pitch-change method 206 is integrated under the harmonic analysis solution method to model the fluid flow 210. Specifically, the profile-transformation pitch-change method 206 is integrated under the harmonic analysis solution method to obtain a fast solution to the transient pitch-change flow problem, in turbomachine configurations having up to 1.5 stages, while using one or few passages per row. It should be appreciated that the approaches described herein utilize a novel and unique combination of the profile-transformation pitch-change method 206 with a new, implicit harmonic analysis solution method 208. Each of these methods is described in further detail below. In analyzing either of the example systems 100, 150, a specification 202 of the system is received, with the specification 202 including one or more of the features described above with reference to FIGS. 1A and 2.

Figure 4:
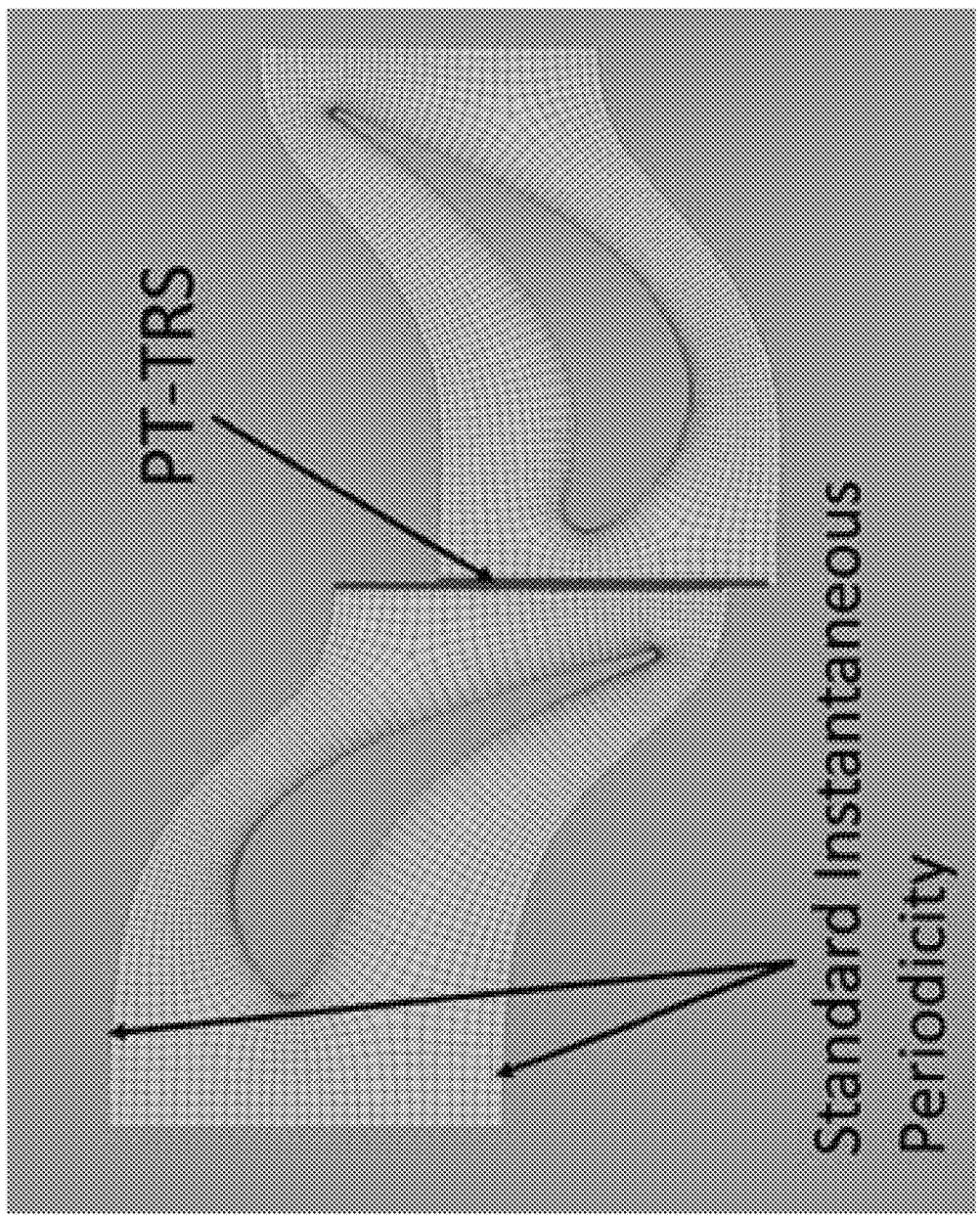
FIGS. 4 and 5A-5C depict features of the profile-transformation pitch-change method.

The profile-transformation pitch-change method 206 models the turbomachine flow with a reduced geometry (e.g., single blade passage per blade row or few blade passages per row) while accounting for pitch difference across adjacent inter-row blade passages. In the profile-transformation pitch-change method 206, rotor and stator blade rows are coupled together via PT interfaces. FIG. 1B illustrates use of PT interfaces 122, 124 to couple rotor and stator blade rows together in reduced geometries 126, 128 while accounting for pitch difference across adjacent inter-row blade passages. A flow profile for fluid flow across a PT interface is expanded or compressed based on a pitch ratio between the rotor and stator blade rows that are coupled together by the PT interface. Thus, the profile-transformation pitch-change method 206 uses an interface-scaling procedure applied to the flow variables across rotor-stator interfaces and assumes that there is periodicity between each passage. To illustrate aspects of the profile-transformation pitch-change method 206, reference is made to FIG. 4. As illustrated in this figure, pitchwise boundaries utilize standard instantaneous periodicity. Further, as shown in FIG. 4, a rotor and stator are coupled together through a PT interface (labeled in FIG. 4 as a "PT-TRS" interface, i.e., a profile-transformation transient rotor stator interface), which is an implicit and conserving profile-exchange transient interface.

In the profile-transformation pitch-change method 206, a geometry of blade rows of the system is not scaled or altered (e.g., the user is not asked to change the geometry or physically alter the shape of the rotor to match the pitch of the stator, etc.). Instead, in the profile-transformation pitch-change method 206, flow profiles at a PT interface are stretched or compressed according to the pitch ratio between blade rows coupled together via the PT interface to maintain full conservation. In the profile-transformation pitch-change method 206, the profile (the flow variables' profiles) on the rotor interface is being stretched to match the pitch of the stator, in an embodiment. Additionally, under the profile-transformation pitch-change method 206, multiple blade passages per row can be modeled to reduce the amount of ensemble interface pitch scaling, if necessary.

Figure 5A:
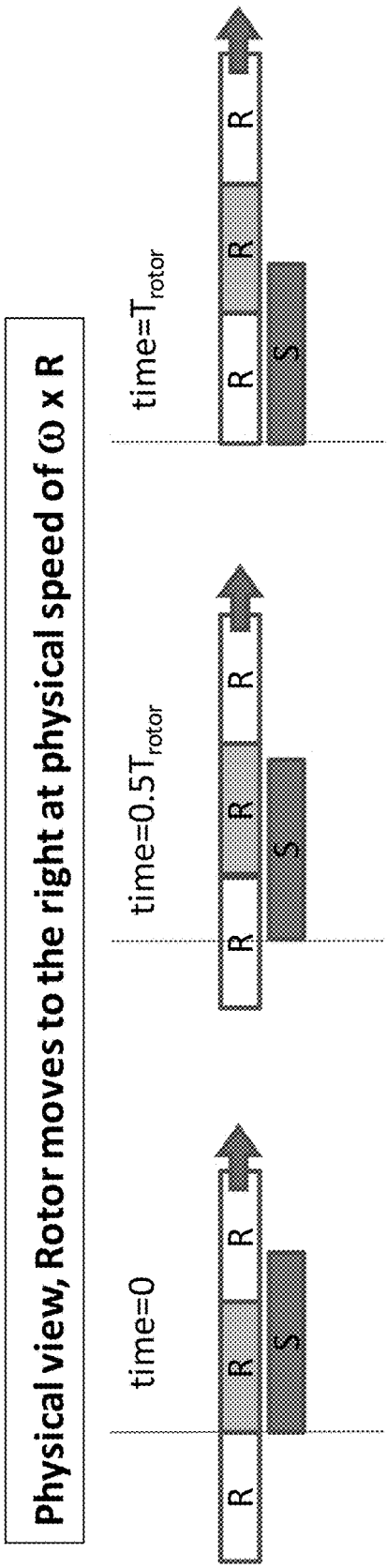
Figure 5B:
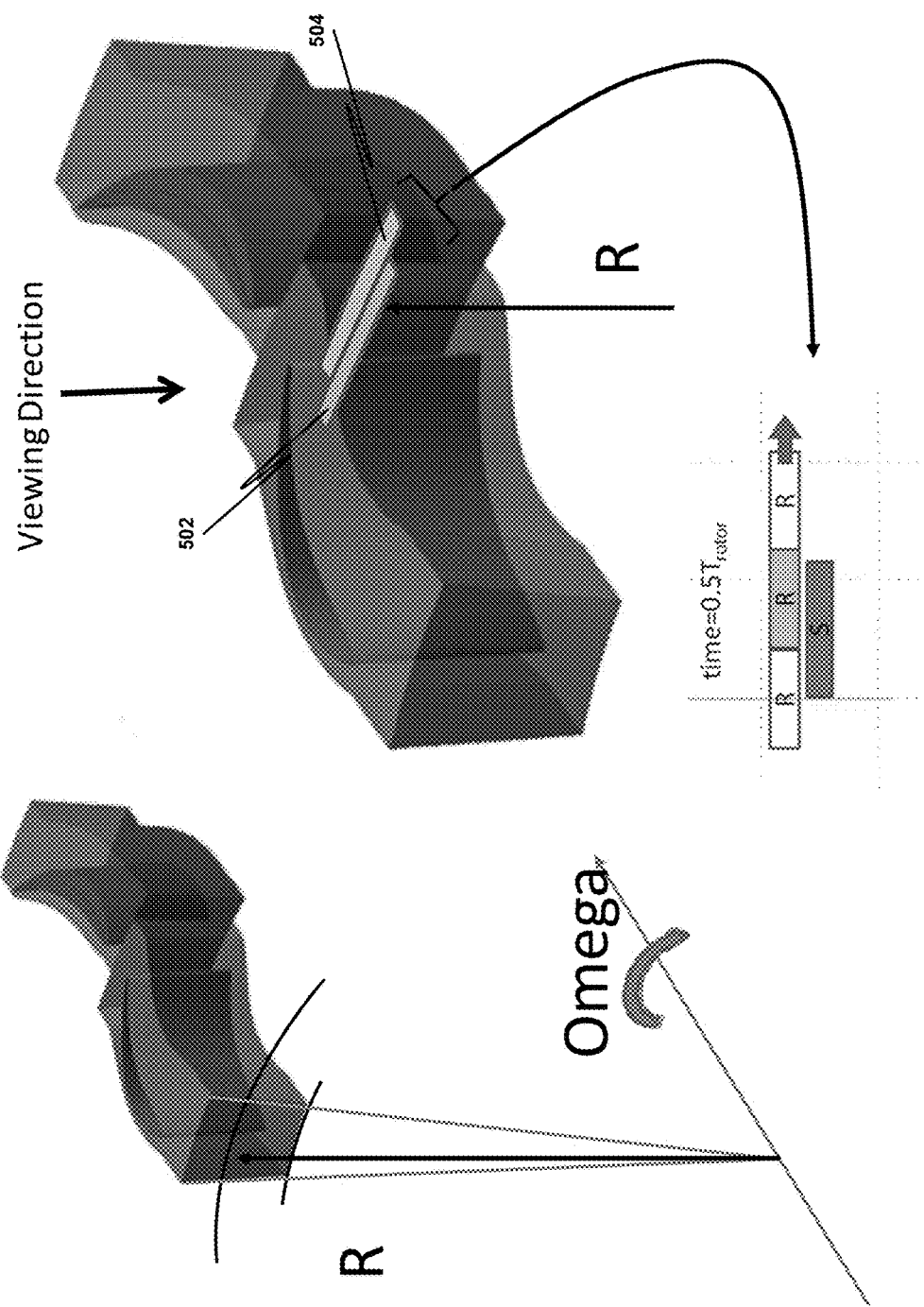
Figure 5C:
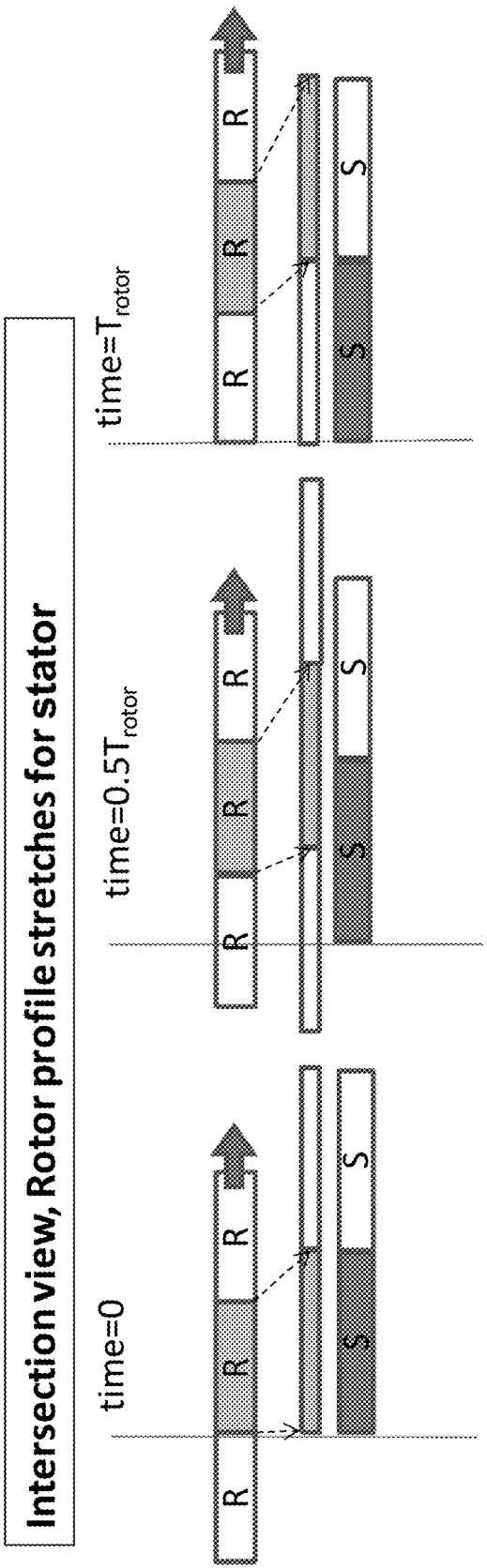

Because the profile-transformation pitch-change method 206 is fully implicit, a fast and robust transient solution can be obtained at a fraction of the cost of a full-wheel time transient rotor-stator simulation. The solution speedup obtained using the profile-transformation pitch-change method 206 versus the full-wheel time transient solution occurs, at least in part, because in the method 206, only a sector of the turbomachine geometry is solved. In the profile-transformation pitch-change method 206, every time the rotor moves one rotor pitch, an adjacent stationary zone (e.g., a stator, an inlet guide vane) sees one full passing of the rotor, independent of the pitch-ratio. To illustrate this concept, reference is made to FIGS. 5A-5C. FIG. 5A depicts a "physical view," in which a rotor (labeled "R" in FIGS. 5A-5C) moves to the right at physical speed of ω×R. In FIG. 5A, ω is angular frequency due to blade passing. FIG. 5A illustrates what happens near rotor-stator interfaces, and a slice of the 3D blade passage geometry at radial distance R is considered. The slice at radial distance R is shown in FIG. 5B. Two strips of that cut (strips 502 and 504, as shown in FIG. 5B) are considered. At location "R," due to rotation of the rotor, the relative velocity between rotor and stator at any point at that plane is ω×R. FIG. 5C depicts an "intersection view," where a rotor profile stretches for a stator (labeled "S" in FIGS. 5A-5C). In the PT algorithm, the profile (the flow variables' profiles) on the rotor interface is being stretched to match the pitch of the stator. This is illustrated in FIG. 5C. The profile from the rotor is being stretched to match the pitch of the stator. The rotor physical geometry remains the same and is not scaled or altered. As illustrated in these figures, in the profile-transformation pitch-change method 206, every time the rotor moves one pitch, the adjacent stationary zone sees one passing of the rotor, and in turn, the rotor sees one passing of the adjacent stationary zone. It is noted that the systems and methods described herein improve the functioning of a computer system as compared to the conventional approaches (e.g., conventional approaches that utilize the full-wheel time transient solution, as described above), because the profile-transformation pitch-change method 206 enables the modeling of systems to be carried out (i) more efficiently (e.g., faster), (ii) with a reduced processing burden, and/or (iii) with reduced memory requirements, as compared to the conventional approaches.

Under the profile-transformation pitch-change method 206, a monitor point located in the rotor or the stator will feel only the rotor passing period and frequency. In reality, a monitor in the rotating frame of reference of the rotor should see the apparent stator passing frequency, while a monitor located on the stationary frame should see the rotor passing frequency. Thus, although the exact frequencies are not captured in the profile-transformation pitch-change method 206, the PT interface utilized in the method 206 captures the strong interaction between the rotor and stator and thus improves the prediction of aerodynamic performance, as compared to traditional steady-state mixing-plane solution methods.

With reference again to FIG. 3, the harmonic analysis solution method 208 is based on the harmonic balance/time spectral solution method and utilizes a hybrid time-frequency numerical solution method to obtain a fast solution to transient periodic flow. Conventional time-transient methods, unlike the harmonic analysis solution method 208 utilized herein, converge on a transient periodic flow by advancing the solution in time until the flow reaches a time-periodic state. Such conventional time-transient methods may be known as "time-marching" methods. The conventional time-marching methods generally take a very long time to reach a converged, periodic-in-time state and thus require significant computational resources. To avoid the use of such conventional time-marching methods, the harmonic analysis solution method 208 is used in the approaches described herein. It is noted that the systems and methods described herein improve the functioning of a computer system as compared to the conventional approaches (e.g., conventional approaches that utilize time-marching methods, as described above), because the harmonic analysis solution method 208 enables the modeling of systems to be carried out (i) more efficiently (e.g., faster), (ii) with a reduced processing burden, and/or (iii) with reduced memory requirements, as compared to the conventional approaches.

In the harmonic analysis solution method 208, if the flow is transient and periodic at a known frequency, then the flow variations can be approximated as harmonics of the fundamental frequency by a Fourier series representation. In the example systems described herein involving turbomachinery (e.g., turbomachine configurations having up to 1.5 stages), the known frequency of the periodic flow may be a frequency of the rotor passing. The harmonics of the Fourier series representation can then be substituted into the governing flow equation to transform the governing flow equation into a set of equations that represents a uniform sampling within the period of the fundamental frequency. The form of the coupled set of transformed equations is similar to a steady-state equation, and therefore, the coupled set of transformed equations can be advanced to convergence using fast, steady-state solution methods.

The accuracy of the harmonic analysis method 208 is based on the number of harmonics (i.e., modes) retained in the Fourier series representation. In general, a minimum of $N=2M+1$ time level samples per period are used to describe the flow, where M is the number of harmonics retained in the Fourier series representation. Therefore, if one (1) mode is retained, then three (3) time-level solutions are required, and if three (3) modes are retained, then seven (7) time-level solutions are required. Typically at least three modes are retained, thus requiring seven time-level solutions. These aspects of the harmonic analysis solution method 208 (e.g., the Fourier series representation, modifying of the governing flow equation, etc.) are described in further detail below with reference to FIG. 6.

Figure 6:
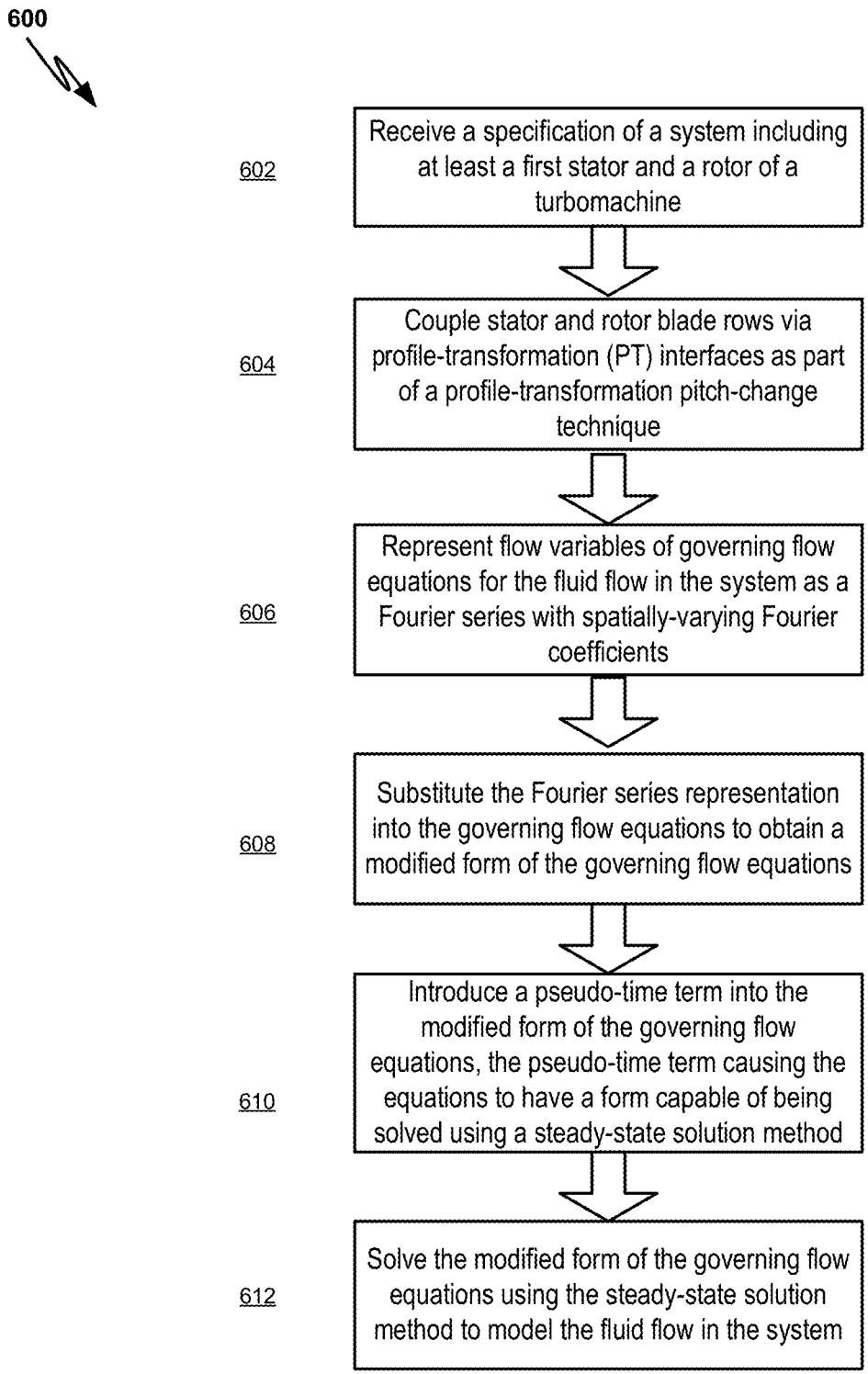
FIG. 6 is a flow diagram depicting example steps of computer-implemented method for modeling fluid flow in blade rows of a turbomachine.

FIG. 3 describes high-level steps of a method for modeling fluid flow in blade rows of a turbomachine, where the steps enable turbomachinery transient flow solutions to be obtained using a combination of the profile-transformation pitch-change method 206 and the harmonic analysis solution method 208. FIG. 6 is a flow diagram 600 depicting additional steps of a computer-implemented method of modeling fluid flow in blade rows of a turbomachine. The example steps of FIG. 6 provide additional details regarding the high-level steps described above with reference to FIG. 3.

In FIG. 6, at 602, a specification of a system is received. Features of the received specification are described above with reference to FIGS. 1A and 2. The system includes at least a first stator and a rotor of a turbomachine. Such a system including only the first stator and the rotor is referred to as a "single-stage turbomachine configuration," an example of which is illustrated in FIG. 1A. The system may also include a first stator, a rotor, and a second stator. Such a system including these blade rows is referred to herein as a "1.5 stage turbomachine configuration," an example of which is illustrated in FIG. 2. As noted above, the stator and rotor blades of the system may be included in any portion of the turbomachine (e.g., near an inlet of the turbomachine, within a middle portion of the turbomachine, near an outlet of the turbomachine, etc.). It is thus noted that the terms "first stator" and "second stator" do not necessarily refer to the respective first and second stationary zones following an inlet of the turbomachine.

At 604, stator blade rows and rotor blade rows of the system are coupled together via profile-transformation (PT) interfaces as part of a profile-transformation pitch-change technique. In the profile-transformation pitch-change technique, a flow profile for fluid flow across a PT interface is expanded or compressed based on a pitch ratio between the stator and rotor blade rows coupled together via the PT interface. The expansion or compression (e.g., scaling) of the flow profile in this manner is described above with reference to FIG. 3. Because the dominant frequency under the profile-transformation pitch-change technique for turbomachine configurations having up to 1.5 stages is the rotor passing frequency and its harmonics, the profile-transformation pitch-change technique works well under the single frequency based harmonic analysis method.

Further, the profile-transformation pitch-change technique utilized at step 604 is fully implicit at both the periodic boundaries of the system under analysis and at the PT interfaces. Thus, for example, in a 1.5 stage turbomachine configuration including two PT interfaces (e.g., as illustrated in FIG. 2), the profile-transformation pitch-change technique is fully implicit at both (i) the first PT interface between the first stator and the rotor, and (iii) the second PT interface between the rotor and the second stator. The approaches described herein result in implicit discretization across the PT interfaces, which is one advantage of the method. As described above, the PT interface is a transient interface that connects together a rotating zone and a stationary zone. In CFD simulations, these zones are divided into many small elements (or volumes) on which governing flow equations are discretized. In explicit discretization, the flow equation on an element in one zone has a loosely-coupled influence from an element on the other side of the interface. The consequence of this loose coupling is that there is a slow update across the interface, which translates to slower convergence of the flow problem. By contrast, in implicit discretization, the flow equation on an element in one zone will have strong coupling and influence from an element on the other side of the interface. The consequence of such strong coupling is that there is a rapid update across the interface, which translates to much faster solution convergence. The combination of the profile-transformation pitch-change method and the harmonic analysis solution method described herein results in an implicit discretization across interfaces, unlike conventional methods. Therefore, there is an advantage in terms of speed of solution convergence. It is thus noted that the systems and methods described herein improve the functioning of a computer system as compared to the conventional approaches (e.g., conventional approaches that utilize explicit discretization, as described above), because the implicit discretization enables the modeling of systems to be carried out more efficiently than in the conventional approaches.

It is further noted that the profile-transformation pitch-change technique does not involve any Fourier-based approximations at the periodic boundaries or the PT interfaces. Thus, the combination of the profile-transformation pitch-change method and the harmonic analysis solution method introduces no additional approximations to the temporal accuracy.

At 606, flow variables of governing flow equations (e.g., Euler or Navier-Stokes) for the fluid flow in the system are represented as a Fourier series with spatially-varying Fourier coefficients, the Fourier series including one or more terms that are based on the rotor's passing frequency. To illustrate this, the governing flow equations may be represented as $$\frac{\partial Q}{\partial t} + \frac{\partial E}{\partial x} + \frac{\partial G}{\partial y} = 0, \quad \text{Equation 1}$$

where Q is a conservative solution vector, E and G are flux vectors, and physical coordinates of the system include spatial coordinates x and y and temporal coordinate t. In conventional methods, Equation 1 is solved using a standard time-marching method to determine the fluid flow in the system. By contrast, in the computer-implemented systems and methods described herein, the fluid flow in the system is not determined by solving Equation 1 using a time-marching method. Rather, as described below, the harmonic analysis method is used in solving Equation 1.

To represent the governing flow equations as the Fourier Series, Equation 1 is rewritten in a semi-discrete form as $$\frac{\partial Q}{\partial t} = -R(Q), \quad \text{Equation 2}$$

and the time periodic flow is described by the Fourier series:

$$Q_j = \hat{Q}_j^0 + \sum_{m=1}^{M} \hat{Q}_j^{mc} \cos(m\omega t) + \sum_{m=1}^{M} \hat{Q}_j^{ms} \sin(m\omega t), \quad \text{Equation 3}$$

$$R_j = \hat{R}_j^0 + \sum_{m=1}^{M} \hat{R}_j^{mc} \cos(m\omega t) + \sum_{m=1}^{M} \hat{R}_j^{ms} \sin(m\omega t), \quad \text{Equation 4}$$

where M is a number of harmonics retained in the Fourier series representation, $\omega$ is the angular frequency due to blade passing, $\hat{Q}_j^{mc}$ or and $\hat{Q}_j^{ms}$ are the cosine and sine of Fourier coefficient for the flow variable $Q_j$ at mesh location j, and $\hat{R}_j^{mc}$ and $\hat{Q}_j^{ms}$ are the cosine and sine of the Fourier coefficient for the residual term $R_j$ at the mesh location j. From Equations 3 and 4, it should be appreciated that the Fourier series includes one or more terms that are based on the rotor's passing frequency (i.e., $\omega$) and does not include terms that are based on other frequencies. It should further be appreciated that the step 606 (i.e., the representing of the flow variables as the Fourier series) comprises a step of the harmonic analysis method, where the harmonic analysis method is a single-frequency harmonic analysis based on the rotor's passing frequency. This is evidenced in Equations 3 and 4 above, which include the single base frequency $\omega$ and multiples of that base frequency (i.e., represented as "m $\omega$"). The harmonic analysis technique is highly efficient for one base frequency. The single-frequency harmonic analysis utilized in the approaches described herein is in contrast to a multi-frequency harmonic analysis. Such a multi-frequency harmonic analysis would include multiple frequency terms (e.g., $\omega_1$, $\omega_2$, and so on). Such multiple frequency terms are not present in Equations 3 and 4 above.

With the M harmonics retained in the Fourier series representation of the flow, N=2M+1 coefficients are stored for each flow variable (e.g., one for the zero-th harmonic or mean flow and 2M for the real and imaginary parts of the remaining harmonics). The Fourier series representation approximates flow variations in the fluid flow as harmonics of a fundamental frequency. As described below, these harmonics are substituted into the governing flow equations.

At 608, the Fourier series representation is substituted into the governing flow equations to obtain a modified form of the governing flow equations. Specifically, (i) flow harmonics of the Fourier series representation are substituted into the governing flow equations, (ii) and then a Discrete Inverse Fourier Transform (DIFT) is used to put the equation back in the time-domain and obtain the modified form of the governing flow equations represented as:

$$[P]\{\tilde{Q}_j\} + \{\tilde{R}_j\} = \{0\}, \quad \text{Equation 5}$$

where matrix [P] contains the time spectral operator coupling all (2M+1) time levels together, $\{\tilde{Q}_j\}$ is a vector of conservation variables at (2M+1) equally-spaced points in time over one temporal period T, the period T being a period of the blade passing, $\{\tilde{R}_j\}$ is a vector of flux variables at the (2M+1) equally-spaced points in time over the one temporal period T, and T is equal to ($2\pi/\omega$). The resultant system of equations represented by Equation 5 comprises a hybrid form including terms in a time domain and terms in a frequency domain and couples N=2M+1 time level solutions together through the [P] matrix.

At 610, a pseudo-time term is introduced into the modified form of the governing flow equations. The pseudo-time term causes the equations to have a form capable of being solved using a steady-state solution method. Specifically, the introducing of the pseudo-time term into Equation 5 yields the following form of the equations capable of being solved using the steady-state solution method:

$$\frac{\partial \{\tilde{Q}_j\}}{\partial \tau} + [P]\{\tilde{Q}_j\} + \{\tilde{R}_j\} = \{0\}, \qquad \text{Equation 6}$$

where $$\frac{\partial \{\tilde{Q}_j\}}{\partial \tau}$$

is the pseudo-time term including a fictitious time τ used to march the solution to a steady state by driving the pseudo-time term to zero. It should be understood that the steps 606, 608, 610 including (i) the representing of the flow variables as the Fourier series, (ii) the substituting of the Fourier series representation into the governing flow equations, and (iii) the introducing of the pseudo-time term comprise steps of a harmonic analysis method. As described herein, the harmonic analysis method enables the governing flow equations to be solved using a hybrid time-frequency solution strategy. Further, as described herein, the harmonic analysis method is fully implicit, thus making it an excellent match for the profile-transformation pitch-change technique, which as described above, is fully implicit at both the periodic boundaries and the PT interfaces.

At 612, the modified form of the governing flow equations is solved using the steady-state solution method to model the fluid flow in the system. As explained above, with the M harmonics retained in the Fourier series representation of the flow, N=2M+1 Fourier coefficients are stored for each flow variable. In solving Equation 6, the N=2M+1 Fourier coefficients for each flow variable may be determined based on a knowledge of a temporal behavior of the flow variables at N=2M+1 equally-spaced points in time over the temporal period T To illustrate the N=2M+1 equally-spaced points in time over the temporal period T, reference is made to FIGS. 7 and 8. FIG. 7 illustrates the placement of a rotor (labeled "R") with respect to a stator (labeled "S") at three-time levels when a single mode is retained in the Fourier series representation of the flow (i.e., M=1). These figures show how the rotor is located at a uniform distance of (⅓) of the rotor period from its previous location, thus defining the minimum of three time levels. The uniform rotor positioning between the levels is also true for a 1.5 stage turbomachine configuration, as shown in FIG. 8.

In an example, Equation 6 is solved using a numerical solution procedure, whereby 2M+1 computational grids are generated, with each of the computational grids being associated with one of the 2M+1 equally-spaced points in time. At each node of the 2M+1 computational grids, values are stored for one or more of the flow variables included in Equation 6. The pseudo-time harmonic balance equation represented by Equation 6 is discretized across the 2M+1 computational grids using a computational fluid dynamics (CFD) technique. The pseudo-time harmonic balance equation is solved across the 2M+1 computational grids using computer-based numerical calculations, where the solving of the pseudo-time harmonic balance equation includes the determining of the 2M+1 Fourier coefficients for each flow variable.

The method of modeling fluid flow in blade rows of a turbomachine, as described above with reference to FIG. 6, takes advantage of the unique capabilities and features of the profile-transformation pitch-change method for up to a 1.5 stage turbomachine, in combination with the harmonic analysis solution method. Because the profile-transformation pitch-change method yields just one base frequency for a Stator/Rotor/Stator configuration, the method is perfectly matched with the harmonic analysis solution method, which is highly efficient for one base frequency, even though the machine has three blade rows, each with independent pitch. Thus, the fact that the profile-transformation pitch-change method yields a solution with a dominant frequency that is the rotor passing frequency for turbomachine configurations having up to 1.5 stages is exploited to great benefit in the methods described herein, such that a single-frequency harmonic solution is sufficient to model flow in the turbomachine configurations having up to 1.5 stages. The profile-transformation pitch-change method is in contrast to Fourier-based pitch-change methods, which require multi-frequency harmonic analysis to model a 1.5 stage turbomachine configuration, due to the presence of multiple independent frequencies between the three blade rows.

Additionally, because the profile-transformation pitch-change method is fully implicit at both the periodic boundaries and at the PT interfaces, the method is a perfect match for the fully implicit harmonic analysis solution method utilized herein. Further, because the profile-transformation pitch-change method does not itself involve any Fourier-based approximations at periodic or interface locations, the combination of the two methods introduces no additional approximations to the temporal accuracy.

The factors described above make the combination of the profile-transformation pitch-change method and the harmonic analysis solution method unique and powerful, an almost fortuitously beneficial combination of characteristics with great benefits. The least accurate instance of this approach requires just three time planes (e.g., when a single mode is retained in the Fourier series representation), and as such, is approximately only three times the computational effort of a simple, conventional steady-state prediction. For this modest cost increase, however, the combination of the profile-transformation pitch-change method and the harmonic analysis solution method for a turbomachine having up to 1.5 stages provides greatly improved simulation accuracy, as compared to conventional steady-state approaches. Under the approaches described herein, strong flow features can cross between the blade rows, mixing is physically resolved (rather than ad hoc modeled), shocks can cross between and interact between components, and so forth.

The present inventors have observed a need for systems and methods for turbomachinery blade row analysis that enable the modeling of complex flow and physics in a reasonable amount of time (e.g., during the design cycle of a turbomachine). Accordingly, the present inventors have developed novel systems and methods for performing such turbomachinery blade row analysis. The numerical solution method strategy described herein, integrating the profile-transformation pitch-change method under the harmonic analysis method, has not been realized or conceived of previously and makes possible a powerful new analysis tool, as described above. For example, the systems and methods described herein enable software (e.g., ANSYS-CFX software) to be used during the design of turbomachinery by allowing engineers to: (i) improve the prediction of aerodynamic performance of turbomachines (e.g., produce more thrust, generate more power, reduce losses), (ii) extend the durability of the turbomachinery (e.g., extend the life of the turbomachinery), and (iii) improve the fuel consumption efficiency of the turbomachinery (e.g., lowering the operating cost of the turbomachinery).

Figure 9:
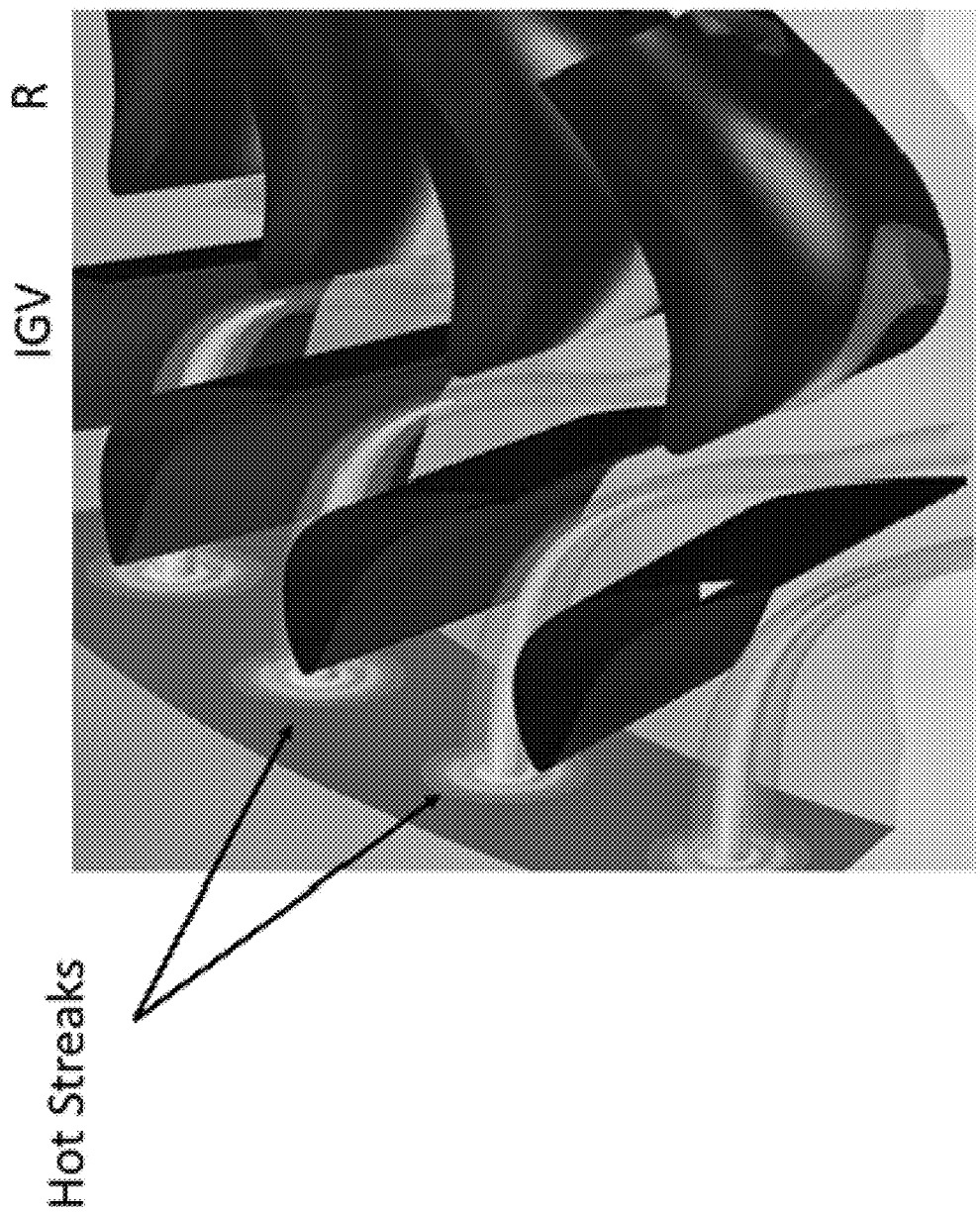
FIG. 9 depicts hot streaks located between an inlet guide vane blade row and a rotor blade row of a turbomachine.
Figure 10:
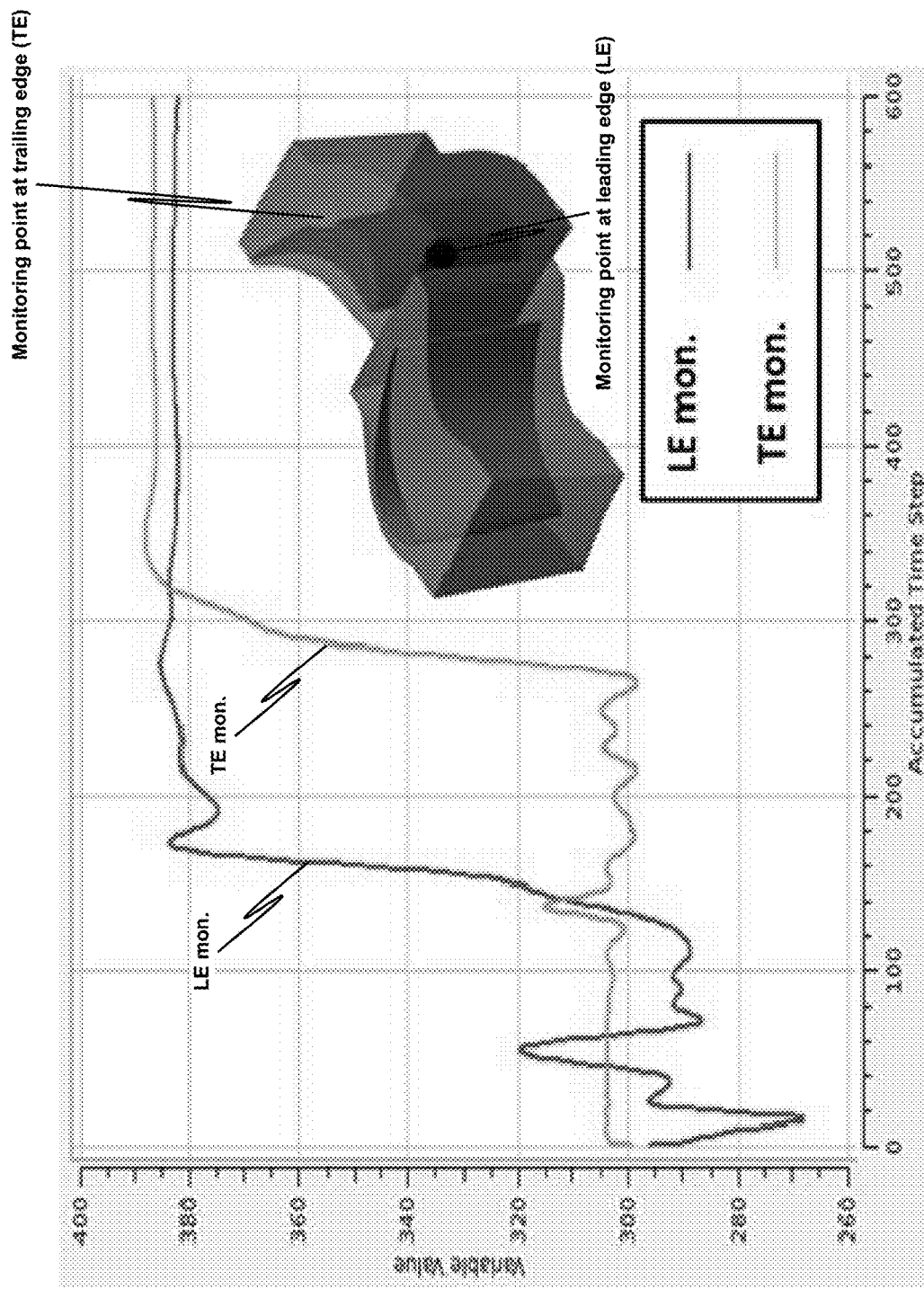
FIG. 10 depicts a solution convergence based on monitoring temperatures at two monitoring locations of a turbomachine.
Figure 11:
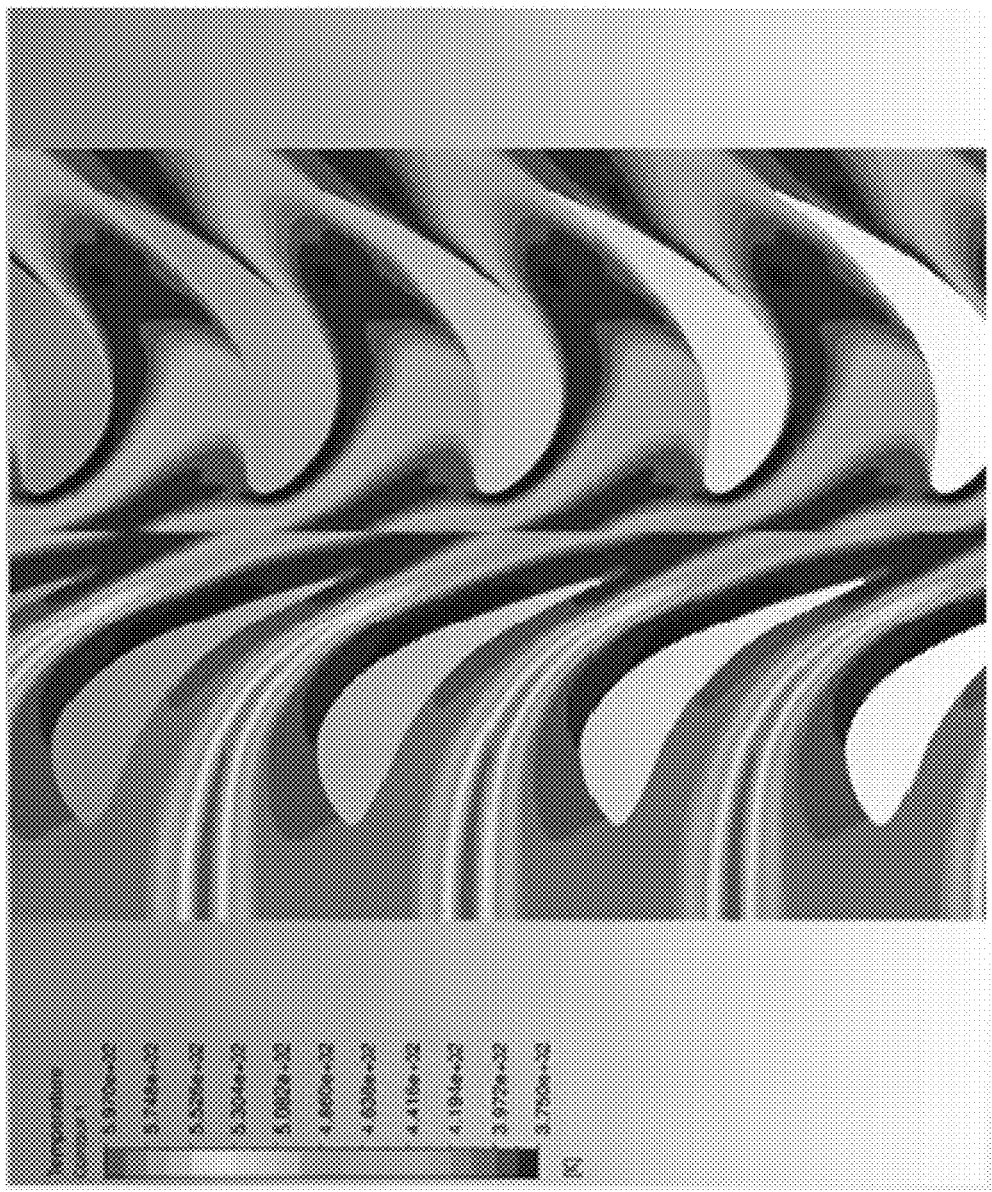
FIG. 11 depicts a solution reconstruction of temperature field at mid span.

FIGS. 9-11 illustrate aspects of a hot streak migration flow problem solved using the systems and methods described herein. It should be understood that the hot streak migration flow problem is only an example and that other types of flow problems may be solved using the combination of the profile-transformation pitch-change and harmonic analysis techniques described herein. In turbine flow analysis, hot streaks refer to the local hot streams of gases emanating from burners of a gas turbine combustor that is positioned in front of the turbine. Hot streaks enter the inlet of the turbine stage, passing through the inlet guide vane (IGV) and propagating through the rows of turbine stages.

In the example of FIGS. 9-11, thirty-six (36) hot streaks enter a turbine stage. The example turbine of FIGS. 9-11 (e.g., having the Aachen Turbine Geometry provided by the Institute of Jet Propulsion and Turbomachinery, RWTH Aachen, Germany) contains thirty-six (36) IGV rows (e.g., stator rows) and forty-two (42) rotor rows. The hot streaks are positioned between an IGV row and a rotor row at approximately mid-span, in this example. This is illustrated in FIG. 9. As illustrated in the figure, hot streaks located between the IGV and rotor row enter the turbine blade rows. Only a single IGV and rotor passage was used in the combination of the profile-transformation pitch-change and harmonic analysis techniques.

The combination of the profile-transformation pitch-change and harmonic analysis techniques is utilized to obtain the converged flow solution in the example of FIGS. 9-11. In the example of these figures, three modes were retained in the Fourier series representation, and therefore, seven time levels were required to solve the flow under the harmonic analysis method. The solution convergence is shown in FIG. 10 for two monitor points located at the leading edge and trailing edge of the rotor and at mid span. Convergence of the system was obtained in 500 iterations. Once the solution is obtained on the seven time levels, the data from all seven time planes can be combined to reconstruct the time transient solution in the time domain for post processing, as shown in FIG. 11. This figure shows solution reconstruction of a temperature field at mid span. Hot streaks are shown to enter the IGV and make their way to the rotor. The discontinuity in the hot streak is due to the modeling approximation of profile compression or expansion in the profile-transformation pitch-change method, which has virtually no impact on solution accuracy for this problem. The capturing of the hot streaks in the second row allows for accurate blade surface temperature prediction. This aerothermal prediction has profound impact in extending the durability of turbine stages. The fast solution of this problem makes this method a viable analysis and design tool for turbomachinery turbine designers.

This written description uses examples to disclose the invention, including the best mode, and also to enable a person skilled in the art to make and use the invention. The patentable scope of the invention may include other examples. Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive of" may be used to indicate situations where only the disjunctive meaning may apply.

It is claimed:

1. A computer-implemented method of modeling fluid flow in blade rows of a turbomachine, the method comprising:
   receiving a specification of a physical system including at least a first stator and a rotor of a turbomachine, wherein
   the first stator and the rotor are coupled via a first profile-transformation (PT) interface according to a profile-transformation pitch-change technique, wherein a flow profile for fluid flow across the first PT interface is expanded or compressed based on a pitch ratio between the first stator and the rotor;
   representing fluid flow in the physical system according to a Fourier series with spatially-varying Fourier coefficients, the Fourier series including one or more terms that are based on the rotor's passing frequency; and determining the fluid flow in the physical system by an implicit solution discretization across the first PT interface, wherein the fluid flow in the physical system is determined based on a modified form of governing flow equations for the fluid flow in the physical system, the modified form of the governing flow equations including a pseudo-time term, the modified form of the governing flow equations corresponding to a substitution of the Fourier series into the governing flow equations, and wherein the determining comprises solving the modified form of the governing flow equations using a steady-state solution method.

2. The computer-implemented method of claim 1, wherein (i) the representing fluid flow in the physical system according to the Fourier series, (ii) the substitution of the Fourier series representation into the governing flow equations, and (iii) the introducing of the pseudo-time term comprise steps of a harmonic analysis technique, the harmonic analysis technique enabling the governing flow equations to be solved using a solution strategy that includes terms in a time domain and terms in a frequency domain.

3. The computer-implemented method of claim 2, wherein the harmonic analysis technique is a single-frequency harmonic analysis based on the rotor's passing frequency.

4. The computer-implemented method of claim 1, wherein the Fourier series includes the one or more terms that are based on the rotor's passing frequency and does not include terms that are based on other frequencies.

5. The computer-implemented method of claim 1, wherein the profile-transformation pitch-change technique is fully implicit (i) at periodic boundaries of the physical system, and (ii) at the first PT interface between the first stator and the rotor.

6. The computer-implemented method of claim 1, wherein the profile-transformation pitch-change technique (i) does not include Fourier-based approximations at periodic boundaries of the physical system, and (ii) does not include Fourier-based approximations at the first PT interface between the first stator and the rotor.

7. The computer-implemented method of claim 1, wherein the physical system includes at least the first stator, the rotor, and a second stator, the method further comprising:

coupling the rotor to the second stator via a second PT interface, wherein a flow profile for fluid flow across the second PT interface is expanded or compressed based on a pitch ratio between the rotor and the second stator, and wherein the implicit solution discretization occurs across (i) the first PT interface, and (ii) the second PT interface.

8. The computer-implemented method of claim 7, wherein the Fourier series includes the one or more terms that are based on the rotor's passing frequency and does not include terms that are based on other frequencies.

9. The computer-implemented method of claim 7, wherein in the profile-transformation pitch-change technique, geometries of the first stator, the rotor, and the second stator are not scaled or altered.

10. The computer-implemented method of claim 7, wherein the profile-transformation pitch-change technique is fully implicit (i) at periodic boundaries of the physical system, (ii) at the first PT interface between the first stator and the rotor, and (iii) at the second PT interface between the rotor and the second stator.

11. The computer-implemented method of claim 7, wherein in the profile-transformation pitch-change technique, a monitor point located in the first stator, the rotor, or the second stator senses only the rotor's passing frequency.

12. The computer-implemented method of claim 1, wherein in the profile-transformation pitch-change technique, when the rotor moves a distance equal to a pitch of the rotor, the first stator coupled to the rotor via the first PT interface senses one full passing of the rotor, independent of the pitch ratio between the first stator and the rotor.

13. The computer-implemented method of claim 1, wherein M harmonics are retained in the Fourier series and $(2M+1)$ Fourier coefficients are retained for each flow variable, the method further comprising:

determining the $(2M+1)$ Fourier coefficients for each flow variable based on a knowledge of a temporal behavior of the flow variables at $(2M+1)$ equally-spaced points in time over a period T, wherein the period T is a period of the blade passing.

14. The computer-implemented method of claim 13, wherein the modified form of the governing flow equations is a pseudo-time harmonic balance equation, the method further comprising:

generating $(2M+1)$ computational grids, wherein each of the computational grids is associated with one of the $(2M+1)$ equally-spaced points in time;

at each node of the $(2M+1)$ computational grids, storing values of one or more of the flow variables;

discretizing the pseudo-time harmonic balance equation across the $(2M+1)$ computational grids using a computational fluid dynamics (CFD) technique; and solving the pseudo-time harmonic balance equation across the $(2M+1)$ computational grids using computer-based numerical calculations, wherein the solving of the pseudo-time harmonic balance equation includes the determining of the $(2M+1)$ Fourier coefficients for each flow variable.

15. The computer-implemented method of claim 1, wherein a pitch of the first stator is not equal to a pitch of the rotor, and wherein the profile-transformation pitch-change technique enables the fluid flow in the physical system to be modeled using a single blade passage or few blade passages per blade row of the physical system.

16. The computer-implemented method of claim 1, wherein in the profile-transformation pitch-change technique, a monitor point located in the first stator, the second stator, or the rotor senses only the rotor's passing frequency and harmonics of the rotor's passing frequency.

17. The computer-implemented method of claim 1, wherein the Fourier series approximates flow variations in the fluid flow as harmonics of a fundamental frequency, and wherein the harmonics are substituted into the governing flow equations.

18. The computer-implemented method of claim 1, wherein the governing flow equations are Euler equations or Navier-Stokes equations.

19. The computer-implemented method of claim 1, wherein the governing flow equations are represented as $$\frac{\partial Q}{\partial t} + \frac{\partial E}{\partial x} + \frac{\partial G}{\partial y} = 0,$$

where Q is a conservative solution vector, E and G are flux vectors, and physical coordinates of the physical system include spatial coordinates x and y and temporal coordinate t.

20. The computer-implemented method of claim 19, wherein the representing of the flow variables as the Fourier series comprises:
rewriting the governing flow equations in a semi-discrete form as $$\frac{\partial Q}{\partial t} = -R(Q),$$

wherein the Fourier series comprises $$Q_j = \hat{Q}_j^0 + \sum_{m=1}^{M} \hat{Q}_j^{mc} \cos(m\omega t) + \sum_{m=1}^{M} \hat{Q}_j^{ms} \sin(m\omega t),$$

$$R_j = \hat{R}_j^0 + \sum_{m=1}^{M} \hat{R}_j^{mc} \cos(m\omega t) + \sum_{m=1}^{M} \hat{R}_j^{ms} \sin(m\omega t),$$

where M is a number of harmonics retained in the Fourier series representation, ω is the angular frequency due to blade passing, $\hat{Q}_j^{mc}$ or and $\hat{Q}_j^{ms}$ are the cosine and sine of Fourier coefficient for the flow variable $Q_j$ at mesh location j, and $\hat{R}_j^{mc}$ and $\hat{R}_j^{ms}$ are the cosine and sine of the Fourier coefficient for the residual term $R_j$ at the mesh location j.

21. The computer-implemented method of claim 20, wherein the substitution of the Fourier series into the governing flow equations comprises:
substituting flow harmonics of the Fourier series into the governing flow equations followed by Discrete Inverse Fourier Transform (DIFT) to put the equation back in the time-domain and obtain the modified form of the governing flow equations represented as $$[P]\{\tilde{Q}_j\}+\{\tilde{R}_j\}=\{0\}, \quad \text{Equation 5}$$

where matrix [P] contains the time spectral operator coupling all (2M+1) time levels together, $\{\tilde{Q}_j\}$ is a vector of conservation variables at (2M+1) equally-spaced points in time over one temporal period T, the period T being a period of the blade passing, $\{\tilde{R}_j\}$ is a vector of flux variables at the (2M+1) equally-spaced points in time over the one temporal period T, and $$\omega = \frac{2\pi}{T}.$$

22. The computer-implemented method of claim 21, wherein the introducing of the pseudo-time term into the modified form of the governing flow equations yields the form of the equations capable of being solved using the steady-state solution method:

$$\frac{\partial \{\tilde{Q}_j\}}{\partial \tau} + [P]\{\tilde{Q}_j\} + \{\tilde{R}_j\} = 0,$$

where $$\frac{\partial \{\tilde{Q}_j\}}{\partial \tau}$$

is the pseudo-time term including a fictitious time τ used to march the solution to a steady state by driving the pseudo-time term to zero.

23. A system for modeling fluid flow in blade rows of a turbomachine, the system comprising:
a processing system; and
a memory in communication with the processing system, wherein the processing system is configured to execute steps comprising:
receiving a specification of a physical system including at least a first stator and a rotor of a turbomachine, wherein
the first stator and the rotor are coupled via a first profile-transformation (PT) interface according to a profile-transformation pitch-change technique, wherein a flow profile for fluid flow across the first PT interface is expanded or compressed based on a pitch ratio between the first stator and the rotor;
representing fluid flow in the physical system according to a Fourier series with spatially-varying Fourier coefficients, the Fourier series including one or more terms that are based on the rotor's passing frequency; and
determining the fluid flow in the physical system by an implicit solution discretization across the first PT interface,
wherein the fluid flow in the physical system is determined based on a modified form of governing flow equations for the fluid flow in the physical system, the modified form of the governing flow equations including a pseudo-time term, the modified form of the governing flow equations corresponding to a substitution of the Fourier series into the governing flow equations, and wherein the determining comprises solving the modified form of the governing flow equations using a steady-state solution method.

24. A non-transitory computer-readable storage medium for modeling fluid flow in blade rows of a turbomachine, the computer-readable storage medium comprising computer-executable instructions which, when executed, cause a processing system to execute steps comprising:
receiving a specification of a physical system including at least a first stator and a rotor of a turbomachine, wherein
the first stator and the rotor are coupled via a first profile-transformation (PT) interface according to a profile-transformation pitch-change technique, wherein a flow profile for fluid flow across the first PT interface is expanded or compressed based on a pitch ratio between the first stator and the rotor;
representing fluid flow in the physical system according to a Fourier series with spatially-varying Fourier coefficients, the Fourier series including one or more terms that are based on the rotor's passing frequency; and
determining the fluid flow in the physical system by an implicit solution discretization across the first PT interface,
wherein the fluid flow in the physical system is determined based on a modified form of governing flow equations for the fluid flow in the physical system, the modified form of the governing flow equations including a pseudo-time term, the modified form of the governing flow equations corresponding to a substitution of the Fourier series into the governing flow equations, and wherein the determining comprises solving the modified form of the governing flow equations using a steady-state solution method.

* * * * *